United States Patent [19]
Sugimoto

[11] Patent Number: 5,931,942
[45] Date of Patent: Aug. 3, 1999

[54] PIPELINE DATA PROCESSING APPARATUS OF REDUCED CIRCUIT SCALE

[75] Inventor: Hideki Sugimoto, Tokyo, Japan

[73] Assignee: NEC Corporation, Tokyo, Japan

[21] Appl. No.: 08/691,871

[22] Filed: Aug. 2, 1996

[30] Foreign Application Priority Data

Aug. 4, 1995 [JP] Japan .................................... 7-200116

[51] Int. Cl.$^6$ ...................................................... G06F 9/38
[52] U.S. Cl. .......................... 712/218; 712/217; 712/219
[58] Field of Search .................................. 395/394, 395, 395/800.41, 392, 393

[56] References Cited

U.S. PATENT DOCUMENTS

| | | | |
|---|---|---|---|
| 5,269,007 | 12/1993 | Hanawa et al. ..................... | 395/800.41 |
| 5,307,502 | 4/1994 | Watanabe et al. .................. | 395/800.41 |
| 5,471,626 | 11/1995 | Carnevale et al. ...................... | 395/395 |
| 5,517,664 | 5/1996 | Watanabe et al. .................. | 395/800.41 |
| 5,555,384 | 9/1996 | Roberts et al. .......................... | 395/392 |

*Primary Examiner*—Frank J. Asta
*Assistant Examiner*—Patrice L. Winder
*Attorney, Agent, or Firm*—Scully, Scott, Murphy & Presser

[57] ABSTRACT

A data processing apparatus executing in a pipelined manner a plurality of instruction including first and second instructions, the first instruction having first register address information and the second instruction having a second register address information, the data processing apparatus has a register file 110 including a plurality of registers, execution means 117, 118 for receiving and executing the first instruction to produce memory address information in a first pipeline cycle and for receiving and executing the second instruction to produce processed data, which is to be stored in the register file 110, in a second pipeline cycle succeeding to the first pipeline cycle, a memory circuit including a data memory 124 and an access control circuit reading out memory data, which is to be stored in the register file, from a memory area of the data memory 124 designated by the memory address information in the second pipeline cycle, and control means 133 for allowing the processed data to be stored in the register 110 file and preventing the memory data from being in the register file when the first register address information is coincident with the second register address information.

7 Claims, 6 Drawing Sheets

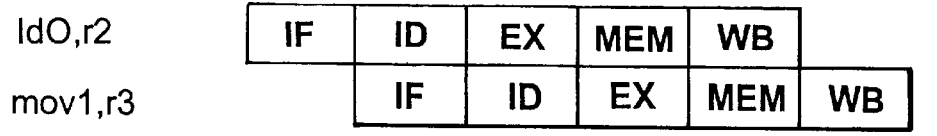
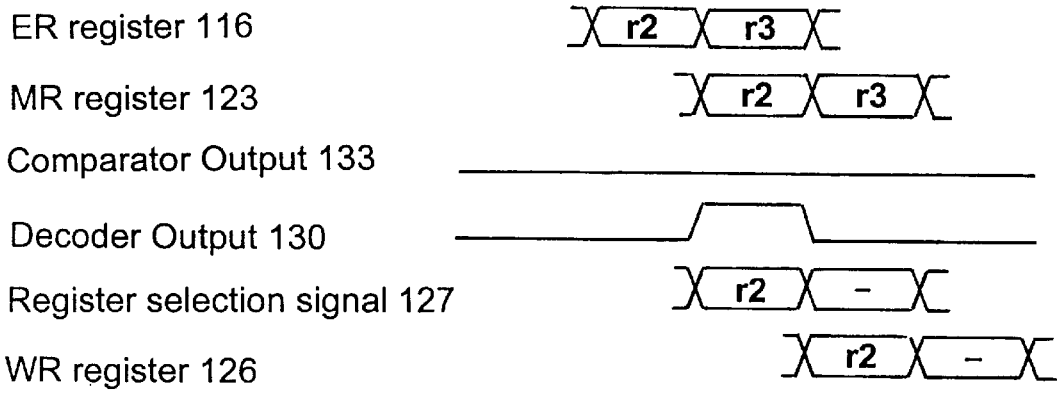
Fig. 2
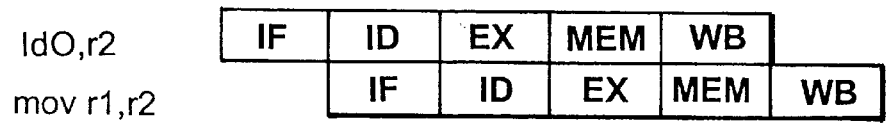
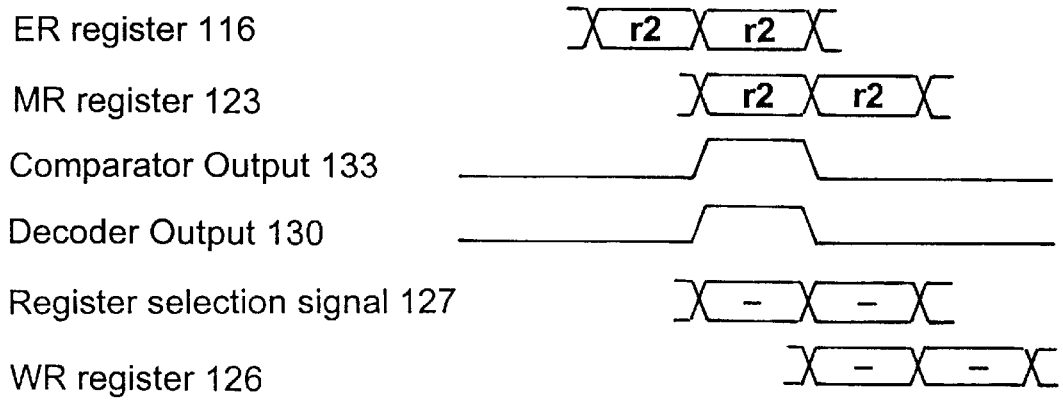
Fig. 3

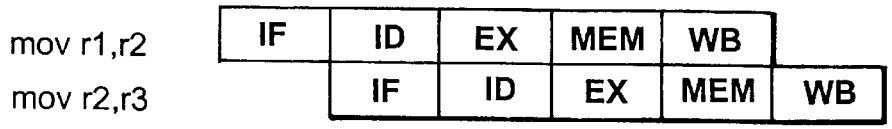

| | IF | ID | EX | MEM | WB |
|---|---|---|---|---|---|
| mov r1,r2 | | | | | |
| mov r2,r3 | IF | ID | EX | MEM | WB |

Register selection signal 507 — r1 / r2
ER register 516 — r2 / r3
MR register 523 — r2 / r3
Short path control signal 531 — pulse
Short path control signal 532 — (low)
Short path control signal 533 — (low)

Fig. 6
Prior Art

| | IF | ID | EX | MEM | WB |
|---|---|---|---|---|---|
| mov r1,r2 | | | | | |
| nop | IF | ID | EX | MEM | WB |
| mov r2,r3 | | IF | ID | EX | MEM | WB |

Register selection signal 507 — r1 / – / r2
ER register 516 — r2 / – / r3
MR register 523 — r2 / – / r3
Short path control signal 531 — (low)
Short path control signal 532 — pulse
Short path control signal 533 — (low)

Fig. 7
Prior Art

PIPELINE DATA PROCESSING APPARATUS OF REDUCED CIRCUIT SCALE

BACKGROUND OF THE INVENTION

1. Field of the Invention

The present invention relates to a data processing apparatus and, more particularly to a data processing apparatus for performing a pipeline processing.

2. Description of the Related Art

Conventionally, in a data processing apparatus for performing a pipeline processing, one instruction can be executed in each clock cycle by allowing each of various instructions handled to use the resources of the respective stages only once in a predetermined order.

FIG. 5 is a block diagram showing the basic configuration of such a data processing apparatus. In this data processing apparatus, in a first (instruction fetch) stage (hereinafter called "IF stage"), an instruction is fetched from an instruction memory (InsnMem) 502 and transferred to an instruction register (IR) 503 in accordance with an address indicated by a fetch pointer (FP) 501. At the same time, the fetch pointer (FP) 501 is incremented by an incrementer (+1) 504 for fetching of the next instruction.

In a second (instruction decode) stage (hereinafter called "ID stage"), an output of the instruction register (IR) 503 is decoded by an instruction decoder (Dec) 505, which then outputs immediate data 506, register selection signals 507, an instruction type signal 508, and a write register selection signal 509. Then, data is read out from a register file (RF) 510 to an internal bus 511 and/or an internal bus 512 in accordance with the register selection signals 507. Part of the thus-read data which are suitable for the execution of an instruction are selected and transferred, together with the immediate data 506, to arithmetic logic unit (ALU) input registers (ALU source register(AS), ALU destination register(AD)) 513 and shifter input registers (Shift control register(SC), Shift data register(SD)) 514 via internal data buses 511 and 512. Further, the instruction type signal 508 and the write register selection signal 509 are transferred, as they are, to an EI register (EI) 515 and an ER register (ER) 516 to prepare for the next stage.

In a third (execution) stage (hereinafter called "EX stage"), a computation corresponding to each instruction is performed by an ALU 517 and a shifter (Shifter) 518. If the instruction is of a type which will not cause access to a data memory (DataMem) 525 of the next, fourth stage accounting for a most part of the process (described later), a determined result is transferred to a pipeline register (ED) 519. If the instruction is of a type which will cause access to the data memory (DataMem) 525, an address calculated by the ALU 517 is transferred to a memory address register (MA) 520. Further, in case of writing, write data that is output from the shifter (Shifter) 518 is transferred to a store data register (SD) 521. To prepare for the next stage, the contents of the EI register (EI) 515 and the ER register (ER) 516 are transferred to an MI register (MI) 522 and an MR register (MR) 523, respectively.

In the fourth (memory) stage (hereinafter called "MEM stage"), if the instruction is of a type which does not cause access to the data memory (DataMem) 525, the only processing performed is to transfer the content of the pipeline register (ED) 519 to a pipeline register (MD) 524. If the instruction is of a type which causes writing to the data memory, the content of the store data register (SD) 521 is written to the data memory (DataMem) 525 in accordance with the address of the memory address register (MA) 520. If the instruction is of a type which causes reading, data is read out in accordance with the address of the memory address register (MA) 520, and transferred to a load data register (LD) 526. To prepare for the next stage, the content of the MR register (MR) 523 is transferred to a WR register (WR) 527. It should be noted that a data memory access instruction decoder 530 has a function of discriminating, from other instructions, an instruction that causes access to the data memory (DataMem) 525.

In a fifth (write back) stage (hereinafter called "WB stage"), if the instruction did not cause access to the data memory (DataMem) 525, the content of the pipeline register (MD) 524 is written to a register of the register file (RF) 510 which is indicated by the WR register (WR) 527. If the instruction caused reading from the data memory (DataMem) 525, the content of the load data register (LD) 526 is transferred to the same register of the register file (RF) 510. Thus, the execution of the instruction is finished.

Incidentally, register selection signal comparators 528 and 529 that are respectively provided in the MEM stage and the WB stage are provided to allow the ensuing instruction to use a result of a preceding instruction before the execution of the latter is finished. The register selection signal comparator 528 serves for the output of a short path control signal 531, and the register selection signal comparator 529 serves for the output of short path control signals 532 and 533. Each of the short path control signals 531 to 533 serves to directly supply a result of a preceding instruction to the ensuing instruction, in order to allow the ensuing instruction to use the result of the preceding instruction before the execution of the latter is finished. The short path control signals 531 to 533 enable the respective short paths 534 to 536, and prohibit reading from corresponding registers.

FIG. 6 is a timing chart showing how each part operates which relates to a first short path function of this data processing apparatus.

As for an instruction sequence of this function, IF, ID, EX, MEM and WB correspond to mov r1, r2, and IF, ID, EX, MEM and WB correspond to mov r2, r3, which is one cycle delayed from mov r1, r2. That is, the first instruction transfers the content of r1 of the register file (RF) 510 to r2, and the second instruction transfers the content of r2 to r3. In executing the second instruction, the ID stage for reading the content of r2 is executed in synchronism with the EX stage of the first instruction. Since at this time point a result of the first instruction has not yet been written to the register file (RF) 510, the reading from r2 produces incorrect data. However, at this time point, since register selection signals 507 and the content of the ER register (ER) 516 have the same content (i.e., r2), a short path control signal 531 is produced. As a result, reading of r2 from the register file (RF) 510 is prohibited and, instead, a result of the first instruction is transferred via the short path 534.

FIG. 7 is a timing chart showing how each part operates which relates to a second short path function of this data processing apparatus. As for an instruction sequence of this function, IF, ID, EX, MEM and WB correspond to mov r1, r2, and IF, ID, EX, MEM and WB correspond to nop, which is one cycle delayed from mov r1, r2. Further, IF, ID, EX, MEM and WB correspond to mov r2, r3, which is one cycle delayed from nop. In this function, the third instruction uses a result of the first instruction. Since the first instruction has reached the MEM stage, the result is transferred via the short path 535.

FIG. 8 is a timing chart showing how each part operates which relates to a third short path function of this data processing apparatus. As for an instruction sequence of this function, IF, ID, EX, MEM and WB correspond to ld 0, r2, and IF, ID, EX, MEM and WB correspond to nop, which is one cycle delayed from ld 0, r2. Further, IF, ID, EX, MEM and WB correspond to mov r2, r3, which is one cycle delayed from nop. In this function, that is, the first instruction of the second short path function shown in FIG. 7 is replaced by the instruction of reading data from the data memory 525. The first instruction is to read the content of address 0 of the data memory 525 and transfer it to r2. Since the result of the first instruction is an output of the data memory 525, it is transferred via the short path 536.

FIG. 9 is a block diagram showing the basic configuration of another data (information) processing apparatus disclosed in the Japanese Patent Laid-Open Hei. 2-232727.

In this data (information) processing apparatus, a register file 901 has two read ports 902 and 903 and two write ports 904 and 905. Thus, a single instruction allows the simultaneous execution of two operations: reading data from the read port 902 and writing it to the write port 904 via an ALU 906, and directly writing data from the read port 903 to the write port 905.

In the above-described data processing apparatus of FIGS. 5 to 8, the execution of one instruction is allowed in each clock cycle by allowing each of various instructions to use resources of the respective stages only once in a predetermined order. Therefore, data needs to be transferred to the final stage even after the determination of a result. This increases pipeline registers and short paths, resulting in increases in circuit scale, cost, and power consumption.

On the other hand, the data (information) processing apparatus of FIG. 9 has an advantage that the data processing can be sped up by virtue of the simultaneous execution of two write operations. However, since the execution mechanism is constructed for a single instruction, if this apparatus is pipelined, the circuit scale, cost, and power consumption are increased as in the case of the above apparatus.

SUMMARY OF THE INVENTION

An object of the present invention is, therefore, to provide a data processor having small circuit scale and high processing speed.

To achieve the above object, a data processing apparatus executing in a pipelined manner a plurality of instruction including first and second instructions, said first instruction having first register address information and said second instruction having a second register address information, said data processing apparatus comprising a register file including a plurality of registers, execution means for receiving and executing said first instruction to produce memory address information in a first pipeline cycle and for receiving and executing said second instruction to produce processed data, which is to be stored in said register file, in a second pipeline cycle succeeding to said first pipeline cycle, a memory circuit including a data memory and an access control circuit reading out memory data, which is to be stored in said register file, from a memory area of said data memory designated by said memory address information in said second pipeline cycle, and control means for allowing said processed data to be stored in said register file and preventing said memory data from being storing in said register file when said first register address information is coincident with said second register address information.

As described above, according to the data processing apparatus of the invention, the numbers of pipeline registers that are used only for a data transfer and associated short paths are reduced from those of the conventional apparatus. Further, the control circuit can finish a particular one of the ensuing instructions whose processing result will be determined in a stage downstream of a prescribed stage at the same time as an instruction preceding the particular instruction, or finish the writing of such a particular instruction before an instruction preceding it, that is, in an order opposite to the instruction issuing order, by suspending the writing of the particular instruction until the execution of the same type of instruction. Therefore, in providing a pipeline configuration, the circuit scale can be reduced and the data processing speed can be increased, as well as the cost and the power consumption can be reduced.

BRIEF DESCRIPTION OF THE DRAWINGS

The above and other object, features and advantages of the present invention will be more apparent from the following description taken in conjunction with the accompanying drawings in which:

FIG. 2 is a timing chart showing how each part operates in the case where write registers are different from each other in the data processing apparatus of FIG. 1;

FIG. 3 is a timing chart showing how each part operates in the case where write registers are the same in the data processing apparatus of FIG. 1;

FIG. 6 is a timing chart showing how each part operates which relates to a first short path function of the data processing apparatus of FIG. 5;

FIG. 7 is a timing chart showing how each part operates which relates to a second short path function of the data processing apparatus of FIG. 5;

DETAILED DESCRIPTION OF THE PREFERRED EMBODIMENTS

Figure 1:
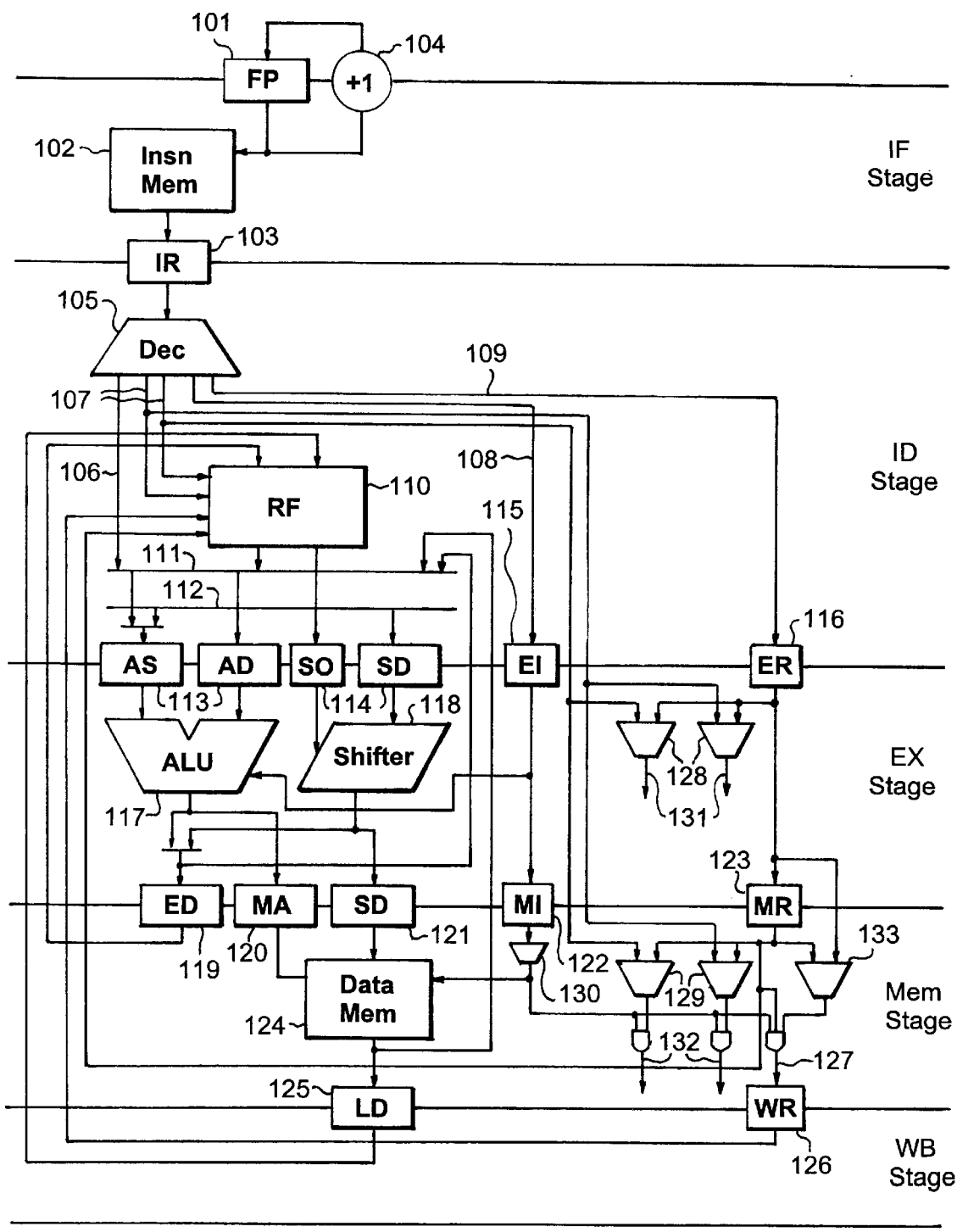
FIG. 1 is a block diagram showing the basic configuration of a data processing apparatus according to a first embodiment of the present invention.

Referring to the drawings, a data processing apparatus according to the present invention will be hereinafter described.

A block diagram showing the basic configuration of a data processing apparatus according to a first embodiment of the invention is shown in FIG. 1.

Figure 5:
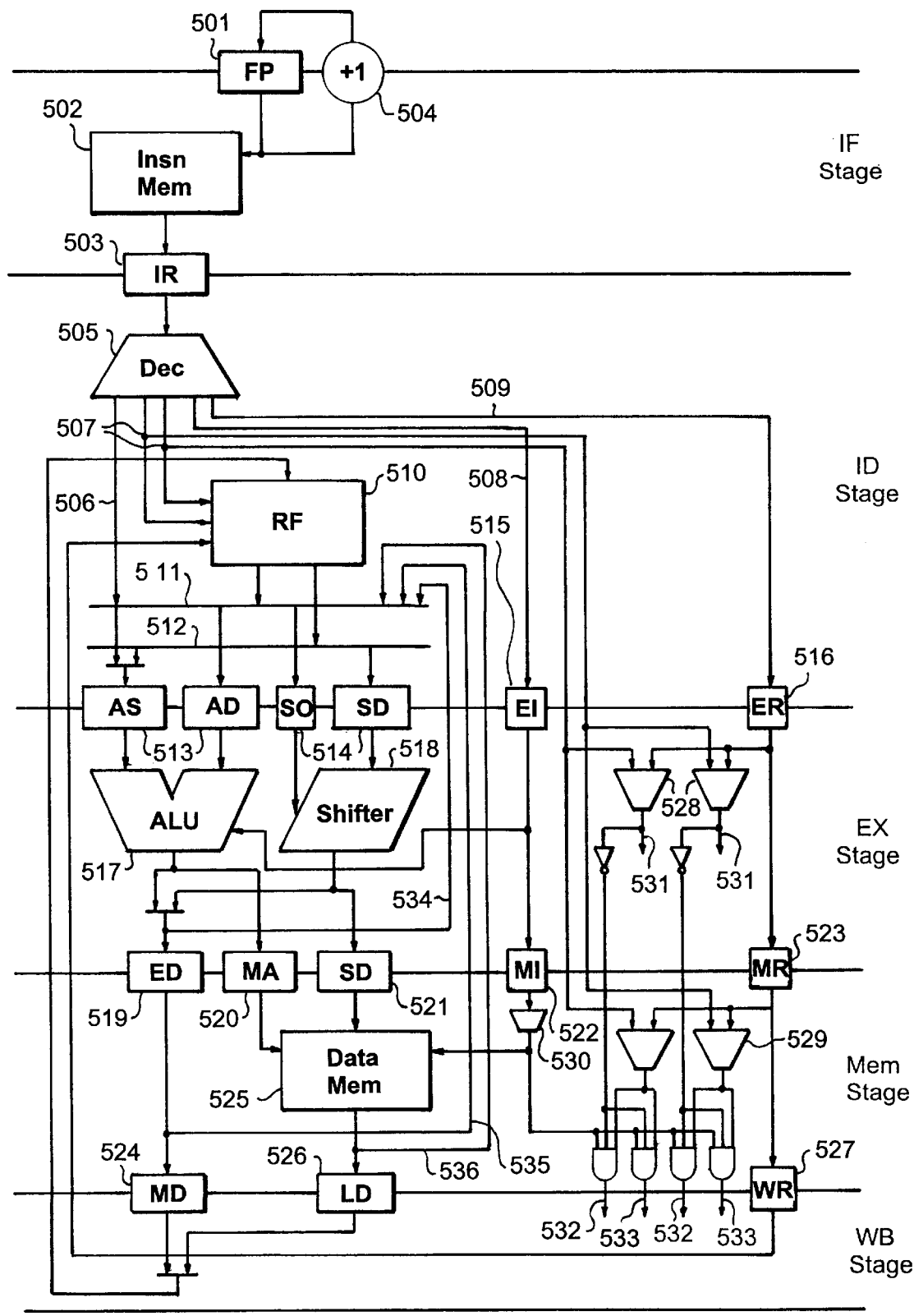
FIG. 5 is a block diagram showing the basic configuration of a conventional data processing apparatus.
Figures 8, 9:
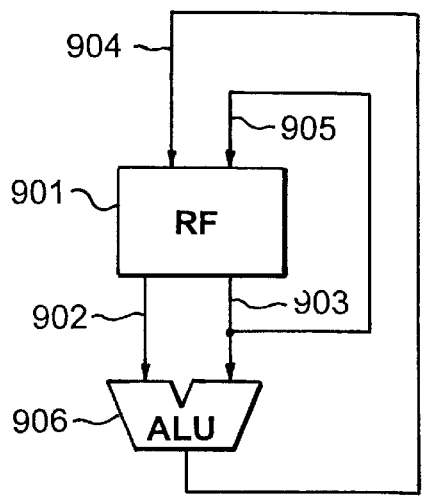
FIG. 8 is a timing chart showing how each part operates which relates to a third short path function of the data processing apparatus of FIG. 5.
FIG. 9 is a block diagram showing the basic configuration of another conventional data processing apparatus.

In this data processing apparatus, an IF stage, an ID stage, and an EX stage are constructed in the same manner as in the conventional apparatus of FIG. 5.

More specifically, in the IF stage, an instruction is fetched from an instruction memory (InsnMem) 102 and transferred to an instruction register (IR) 103 in accordance with an address indicated by a fetch pointer (FP) 101. The instruction register (IR) 103 latches the address in response to an upper edge of a system clock. At the same time, the fetch pointer (FP) 101 is incremented by an incrementer (+1) 104 for fetching of the next instruction.

In the ID stage, the instruction of the instruction register (IR) 103 is decoded by an instruction decoder (Dec) 105, which then outputs immediate data 106, register selection signals 107 for indicating a source register and a destination register, for example r1, r2, an instruction type signal 108 for indicating whether the instruction is using data memory 125 or not, and a write register selection signal 109 for indicating the register address of register file 510 to be storing a result of executing the instruction. Then, data is read out from a register file (RF) 110 in accordance with the register selection signals 107. Part of the thus-read data which are suitable for the execution of an instruction are selected and transferred, together with the immediate data 106, to ALU input registers (AS, AD) 113 and shifter input registers (SC, SD) 114 via internal data buses 111 and 112. Further, the instruction type signal 108 and the write register selection signal 109 are transferred, as they are, to an EI register (EI) 115 and an ER register (ER) 116 to prepare for the next stage. Then the EI register (EI) 115 and the ER register (ER) 116 latch corresponding data in response to the upper edge of the system clock.

In EX stage, a computation corresponding to each instruction is performed by an ALU 117 and a shifter (Shifter) 118. If the instruction is of a type which will not cause access to a data memory (DataMem) 124 of the next, MEM stage accounting for a most part of the process (described later), a determined result is transferred to a pipeline register (ED) 119. If the instruction is of a type which will cause access to the data memory (DataMem) 124, an address calculated by the ALU 117 is transferred to a memory address register (MA) 120. Further, in case of writing, write data that is output from the shifter (Shifter) 118 is transferred to a store data register (SD) 121. To prepare for the next stage, the contents of the EI register (EI) 115 and the ER register (ER) 116 are transferred to an MI register (MI) 122 and an MR register (MR) 123 in response to the upper edge of the system clock, respectively.

In the MEM stage, if the instruction is of a type which does not cause access to the data memory (DataMem) 124, the content of the pipeline register (ED) 119 is written to the register file (RF) 110 in accordance with the content of the MR register 123 and in response to the upper edge of the system clock. After that, the execution of the instruction is finished. If the instruction is of a type which causes writing to the data memory (DataMem) 124, the content of the store data register (SD) 121 is written to the data memory (DataMem) 124 in accordance with the address of the memory address register (MA) 120. If the instruction is of a type which causes reading, data is read out in accordance with the address of the memory address register (MA) 120, and transferred to a load data register (LD) 125 in response to the upper edge of the system clock. To prepare for the next stage, the content of the MR register (MR) 123 is transferred to a WR register (WR) 126 in response to the upper edge of the system clock. This is not done directly, and a register selection signal as masked by a later-described condition is transferred. It should be noted that a data memory access instruction decoder 130 has a function of discriminating, from other instructions, an instruction that causes access to the data memory (DataMem) 124.

The WB stage is needed only for an instruction that caused reading from the data memory (DataMem) 124, in which case the content of the pipeline register (LD) 125 is transferred to a register of the register file (RF) 110 which is indicated by the WR register (WR) 126 and the execution of the instruction is finished. At this time, there is a possibility that the ensuing instruction will be written to the same register. To avoid this, such an attempt is detected by a comparator 133. At an occurrent of such an attempt, priority is given to the writing of the ensuing instruction with a register selection signal 127 used as a mask. The masking is also effected for instructions other than the reading instruction, because the instructions have already been finished at this time point and hence do not require writing.

Register selection signal comparators 128 and 129 that are respectively provided in the MEM stage and the WB stage are provided to allow the ensuing instruction to use a result of a preceding instruction before the execution of the latter is finished. The register selection signal comparator 128 and 129 output short path control signals 131 and 132. Each of the short path control signals 131 and 132 serves to directly supply a result of a preceding instruction to the ensuing instruction, in order to allow the ensuing instruction to use the result of the preceding instruction before the execution of the latter is finished.

FIG. 2 is a timing chart showing how each part operates in the case where write registers are different from each other in this data processing apparatus. As for an instruction sequence in this case, IF, ID, EX, MEM and WB stages correspond to Id 0, r2, and IF, ID, EX, MEM and WB stages correspond to mov r1, r3, which is one cycle (one system clock) delayed from Id 0, r2. In this case, the writing register used in Ld 0, r2 is different form the writing register used in mov r1, r3. That is, writing to the register r2 of the first instruction and writing to the register r3 of the second instruction are performed simultaneously.

FIG. 3 is a timing chart showing how each part operates in the case where write registers are the same in this data processing apparatus. As for an instruction sequence in this case, IF, ID, EX, MEM and Wb correspond to Id 0, r2, and IF, ID, EX, MEM and Wb correspond to mov r1, r2, which is one cycle delayed from Id 0, r2. In this case, the writing register used in Ld 0, r2 is same the writing register used in mov r1, r2. That is, writing from the pipeline register (ED) 119 is effected without effecting writing from the load data register (LD) 125 by causing the comparator 133 to detect coincidence between the ER register (ER) 116 and the MR register (MR) 123 and invalidating a register selection signal 133.

That is, in this data processing apparatus, a pipeline register in the WB stage and an associated short path are omitted, whereby the circuit scale is reduced. Further, there are provided the following functions: a function (write disabling means) of causing the comparator 133 of the MEM stage to mask the writing of a preceding instruction when the ensuing instruction has the same writing item as the preceding instruction, and a function (instruction control means) of writing, to the register file (RF) 110 in the MEM stage, a particular instruction of the ensuing instructions whose processing result has been determined in the EX stage, and masking a signal directed to the WR register (WR) 126 of the WB stage which stores a writing item. With this configuration, the instruction control means can finish a particular one of the ensuing instructions whose processing result will be determined in a stage downstream of a prescribed stage at the same time as an instruction preceding the particular instruction, or finish such a particular instruction before an instruction preceding it, that is, in an order opposite to the instruction issuing order, by suspending the writing of the particular instruction until the execution the same type of instruction by means of the WR register (WR) 126.

Figure 4:
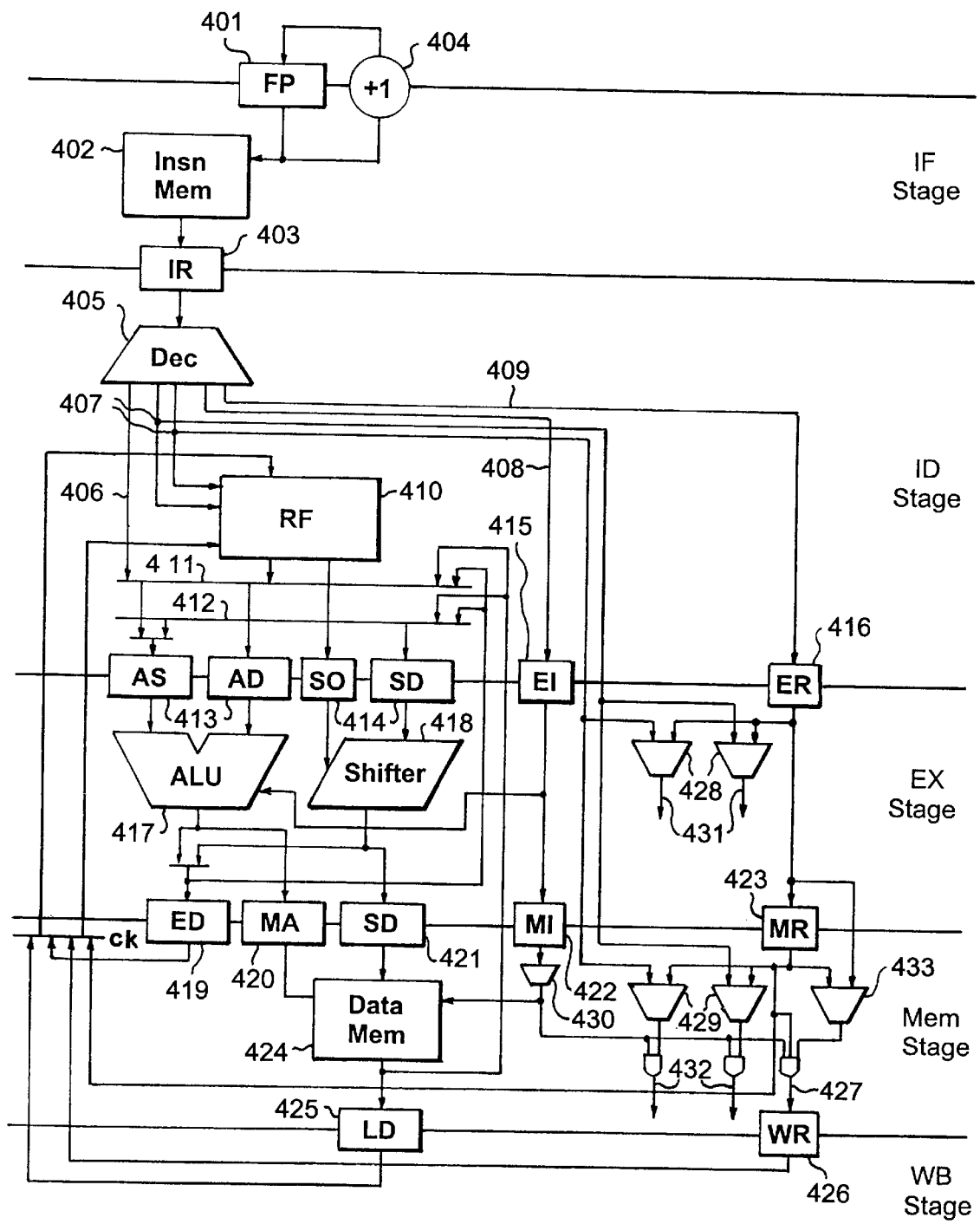
FIG. 4 is a block diagram showing the basic configuration of a data processing apparatus according to a second embodiment of the invention.

FIG. 4 is a block diagram showing the basic configuration of a data processing apparatus according to a second embodiment of the invention.

This data processing apparatus is different from the data processing apparatus of FIG. 1 in that instead of providing two write ports in a register file (RF) 410 that corresponds to the register file (RF) 110, two writing operations are allowed in the same stage, for instance, in such a manner that writing from a pipeline register (ED) 419 is effected in the first half of the system clock clk(or a down edge of the system clock clk) and writing from a load register (LD) 425 is effected in the second half of the system clock clk(or the upper edge of the system clock clk). Since the remaining part of the configuration and the remaining functions are the same as those of the first embodiment, descriptions therefor are omitted. This embodiment is superior to the first embodiment in that an increase of write ports causes less increase of the circuit scale.

That is, also in this data processing apparatus, pipeline registers and associated short paths, which exist conventionally, are reduced in number. Further, there are provided the following functions: a function (write disabling means) of causing a comparator 433 of the MEM stage to mask the writing of a preceding instruction when the ensuing instruction has the same writing item as the preceding instruction, and a function (instruction control means) of writing, to the register file (RF) 410 in the MEM stage, a particular instruction of the ensuing instructions whose processing result has been determined in the EX stage, and masking a signal directed to a WR register (WR) 426 of the WB stage which stores a writing item. With this configuration, the instruction control means can finish a particular one of the ensuing instructions whose processing result will be determined in a stage downstream of a prescribed stage at the same time as an instruction preceding the particular instruction, or finish such a particular instruction before an instruction preceding it, that is, in an order opposite to the instruction issuing order, by suspending the writing of the particular instruction until the execution the same type of instruction by means of the WR register (WR) 426.

Although the invention has been described with reference to specific embodiment, this description is not meant to be construed in a limiting sense. Various modifications of the disclosed embodiments, as well as other embodiments of the invention, will become apparent to persons skilled in the art upon reference to the description of the invention. It is therefore contemplated that the appended claim will cover any modification or embodiments as fall within the true scope of the invention.

What is claimed is:

1. A pipeline data processing apparatus comprising:
   a register file having a plurality of registers;
   a first circuit for outputting a first data to a first register of said register file in accordance with a first instruction in a first period;
   a second circuit receiving a second data of a second instruction from said first circuit executed before said first instruction in said first circuit for outputting a third data to a second register of said register file in accordance with said second data in said first period;
   a comparator for outputting a first signal when said first register and said second register indicate same register of said register file and outputting a second signal when said first register and said second register indicate different register each other;
   a control circuit for transferring said third data to corresponding register of said register file in accordance with a content of said second register when said comparator outputs said second signal, and for transferring said first data to corresponding register of said register file in accordance with a content of said first register when said comparator outputs said first signal, whereby said first instruction is completed concurrently with or before completion of said second instruction.

2. The apparatus as claimed in claim 1, further comprising:
   a third circuit for fetching said first and second instruction from an instruction memory and outputting said first and second instruction.

3. The apparatus as claimed in claim 2, further comprising:
   a fourth circuit for decoding said first and second instruction and outputting said decoded first and second instruction to said first circuit.

4. A pipeline data processing apparatus comprising:
   an instruction fetch circuit for fetching an instruction from an instruction memory and outputting said instruction;
   an instruction decode circuit having a register file including a plurality of registers and a decoder and receiving said instruction from said instruction fetch circuit in response to a system clock for decoding said instruction and selecting a register in accordance with said decoded instruction and outputting said decoded instruction and an information for identifying said selected register;
   an execution circuit receiving said decoded instruction from said instruction decode circuit in response to said system clock for executing said decoded instruction and outputting a first data as a result of executing;
   a data memory circuit receiving said first data in response to said system clock for outputting a second data read out from a data memory in accordance with said first data when said instruction requests reading out from said data memory;
   a first writing register for storing said information of said writing register of said instruction in response to said system clock when said instruction is executed in said execution unit;
   a second writing register for storing said information of said writing register of said instruction in response to said system clock when said instruction is in said data memory circuit;
   a comparator for comparing said information stored in said first writing register with said information stored in said second writing register and outputting a first signal when said information stored in said first writing register and said information stored in said second writing register are same and outputting a second signal when said information stored in said first writing register and said information stored in said second writing register are different from each other;
   a first data path means for transferring said first data to corresponding register of said register file in accordance with said information stored in said first writing register; and
   a second data path means for transferring said second data to corresponding register of said register file in accordance with said information stored in said second writing register when said comparator outputs said second signal, and said second data path being prohibited transferring said second data when said comparator outputs said first signal.

5. A pipeline data processing apparatus comprising:

an instruction fetch circuit for fetching an instruction from an instruction memory and outputting said instruction;

an instruction decode circuit having a register file including a plurality of registers and a decoder and receiving said instruction from said instruction fetch circuit in response to a system clock for decoding said instruction and selecting a register in accordance with said decoded instruction and outputting said decoded instruction and an information for identifying said selected register;

an execution circuit receiving said decoded instruction from said instruction decode circuit in response to said system clock for executing said decoded instruction and outputting a first data as a result of executing;

a data memory circuit receiving said first data in response to said system clock for outputting a second data read out from a data memory in accordance with said first data when said instruction requests reading out from said data memory;

a first write register for storing said information of said writing register of said instruction in response to said system clock when said instruction is executed in said execution unit;

a second write register for storing said information of said writing register of said instruction in response to said system clock when said instruction is in said data memory circuit;

a comparator for comparing said information stored in said first write register with said information stored in said second write register and outputting a first signal when said information stored in said first write register and said information stored in said second write register are same and outputting a second signal when said information stored in said first write register and said information stored in said second write register are different from each other;

a first data path means for transferring said first data to a selecting circuit in accordance with said information stored in said first write register; and a second data path means for transferring said second data to said selecting circuit in accordance with said information stored in said second write register when said comparator outputs said second signal, and said second data path being prohibited transferring said second data when said comparator outputs said first signal;

said selecting circuit for outputting said first data to selected register of said register file based on said information of said first write register in response to a first part of one period of said system clock and for outputting said second data to selected register of said register file based on said information of said second write register in response to a second part of said one period of said system clock.

6. The apparatus as claimed in claim 5, wherein said one period of said system clock includes said first and second part of said system clock, and said second part of said one period of said system clock is remaining part of said one period of said system clock.

7. A data processing apparatus executing in a pipelined manner a plurality of instruction including first and second instructions, said first instruction having first register address information and said second instruction having a second register address information, said data processing apparatus comprising a register file including a plurality of registers, execution means for receiving and executing said first instruction to produce memory address information in a first pipeline cycle and for receiving and executing said second instruction to produce processed data, which is to be stored in said register file, in a second pipeline cycle succeeding to said first pipeline cycle, a memory circuit including a data memory and an access control circuit reading out memory data, which is to be stored in said register file, from a memory area of said data memory designated by said memory address information in said second pipeline cycle, and control means for allowing said processed data to be stored in said register file and preventing said memory data from being stored in said register file when said first register address information is coincident with said second register address information, whereby said instruction executed in said succeeding pipeline cycle is completed concurrently with or before completion of said instruction executed in said first pipeline cycle.

* * * * *